United States Patent
Beadle et al.

(10) Patent No.: US 6,433,794 B1
(45) Date of Patent: Aug. 13, 2002

(54) METHOD AND APPARATUS FOR SELECTING A JAVA VIRTUAL MACHINE FOR USE WITH A BROWSER

(75) Inventors: Bruce Anthony Beadle, Round Rock; Michael Wayne Brown, Georgetown; Michael Aaron Kaply, Austin; Douglas Scott Rothert, Austin; Robert Michael Russin, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,339

(22) Filed: Jul. 31, 1998

(51) Int. Cl.[7] .................................................. G06F 3/00
(52) U.S. Cl. ...................... 345/700; 345/735; 345/965; 717/138
(58) Field of Search ................................ 345/326, 329, 345/966, 333, 700, 735, 762–764, 965; 717/11, 168–173

(56) References Cited

U.S. PATENT DOCUMENTS

| | | | | |
|---|---|---|---|---|
| 5,634,057 A | * | 5/1997 | Dickinson | 709/315 |
| 5,666,501 A | * | 9/1997 | Jones et al. | 345/348 |
| 6,031,533 A | * | 2/2000 | Peddada | 345/349 |
| 6,094,677 A | * | 7/2000 | Capek et al. | 709/219 |

* cited by examiner

Primary Examiner—Kristine Kincaid
Assistant Examiner—Sy D. Luu
(74) Attorney, Agent, or Firm—Duke W. Yee; Jeffrey S. LaBaw; Stephen R. Tkacs

(57) ABSTRACT

A method in a data processing system for selecting a Java virtual machine for use with a browser. A user is prompted for an input, wherein input identifies a virtual machine to be used with the browser. A profile is altered for the browser to include an identification of the virtual machine identified by the input. The profile is used to select a virtual machine for use with the browser.

15 Claims, 6 Drawing Sheets

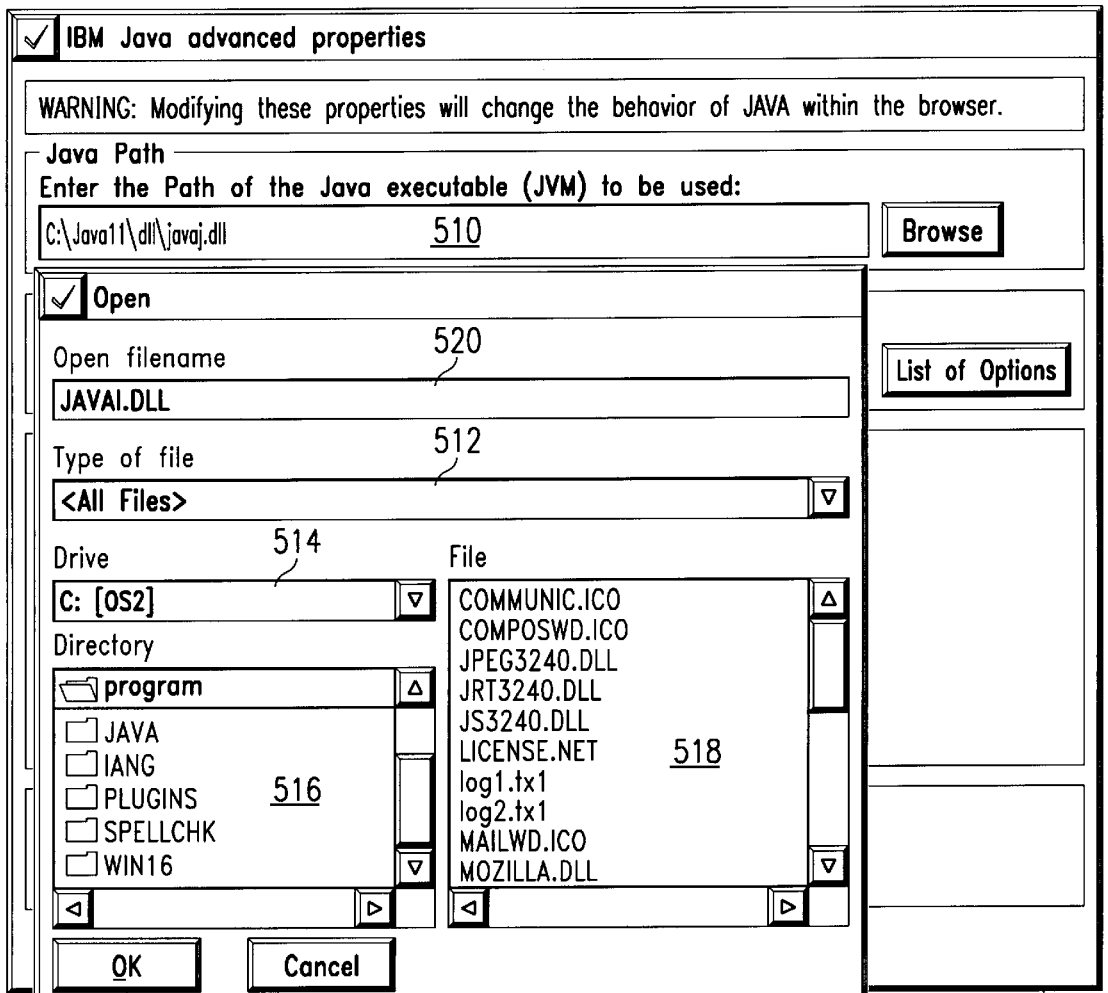
FIG. 5C
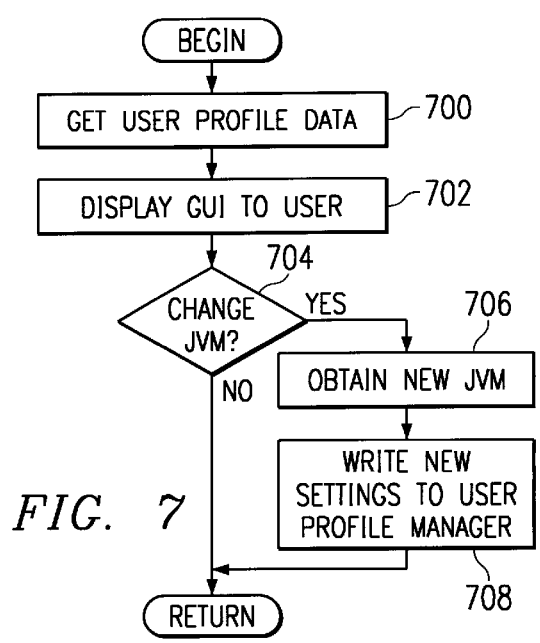
FIG. 6
FIG. 7

METHOD AND APPARATUS FOR SELECTING A JAVA VIRTUAL MACHINE FOR USE WITH A BROWSER

CROSS-REFERENCE TO RELATED APPLICATION

The present invention is related to the following applications entitled "Method and Apparatus for Selectively and Dynamically Selecting Classes in a Data Processing System", Ser. No. 09/127,336, filed even date hereof, assigned to a common assignee, and "Method and Apparatus to Selectively Define Java Virtual Machine Initializing Properties Using a Browser Graphical User Interface", Ser. No. 09/127,337, filed even date hereof, are incorporated herein by reference.

BACKGROUND OF THE INVENTION

1. Technical Field

The present invention relates generally to an improved data processing system, and in particular to a method and apparatus for selecting an application. Still more particularly, the present invention relates to a method and apparatus for selecting a Java virtual machine for use with a browser program.

2. Description of Related Art

Internet, also referred to as an "internetwork", in communications is a set of computer networks, possibly dissimilar, joined-together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

Often applications or programs may be sent to a computer from a web server across the Internet. Java applications are becoming increasingly more prevalent as the type of application sent between web servers and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

Many currently available web browsers, such as Netscape Communicator, which is available from Netscape Communications Corporation, incorporate JVMs as part of the web browser. Presently, however, JVMs updates are provided more often than web browser updates. Such a situation prevents users from taking advantage of improved versions of JVMs until the web browser is updated. Another problem that occurs is that some applications will function better with earlier versions of a JVM opposed to a newer version released with a newer version of a browser. Therefore, it would be advantageous to have an improved method and apparatus for providing users an ability to use more recent versions of JVMs without having to wait for an updated version of the web browser.

SUMMARY OF THE INVENTION

The present invention provides a method in a data processing system for selecting a Java virtual machine for use with a browser. A user is prompted for an input, wherein input identifies a virtual machine to be used with the browser. A profile is altered for the browser to include an identification of the virtual machine identified by the input. The profile is used to select a virtual machine for use with the browser.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A–5C are graphical user interfaces employed to select a Java virtual machine in accordance with a preferred embodiment of the present invention;

FIG. 6 is a diagram of a user profile data structure managed by a user profile manager in accordance with a preferred embodiment of the present invention;

FIG. 7 is a high level flowchart of a process used to select a JVM for use with a web browser in accordance with a preferred embodiment of the present invention;

DETAILED DESCRIPTION OF THE PREFERRED EMBODIMENT

Figure 1:
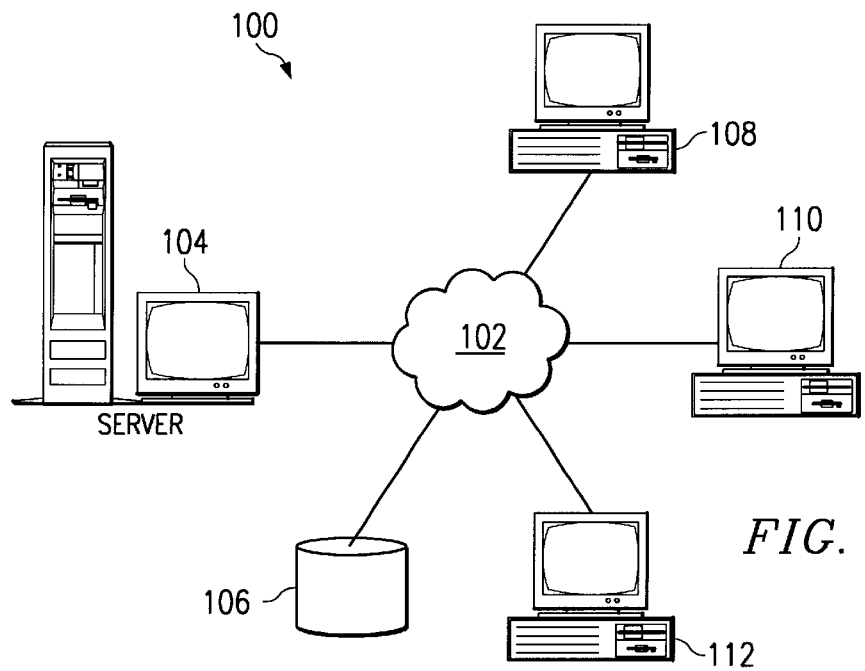
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
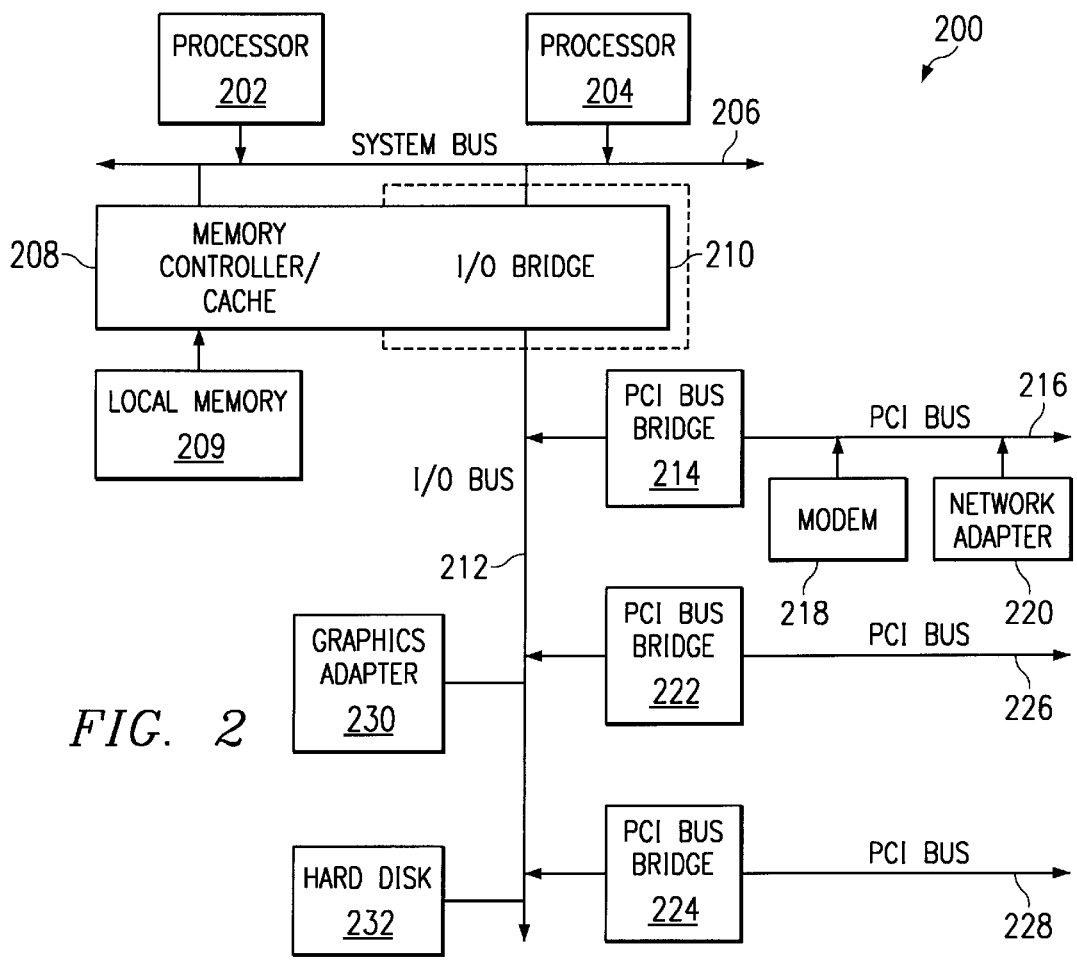
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
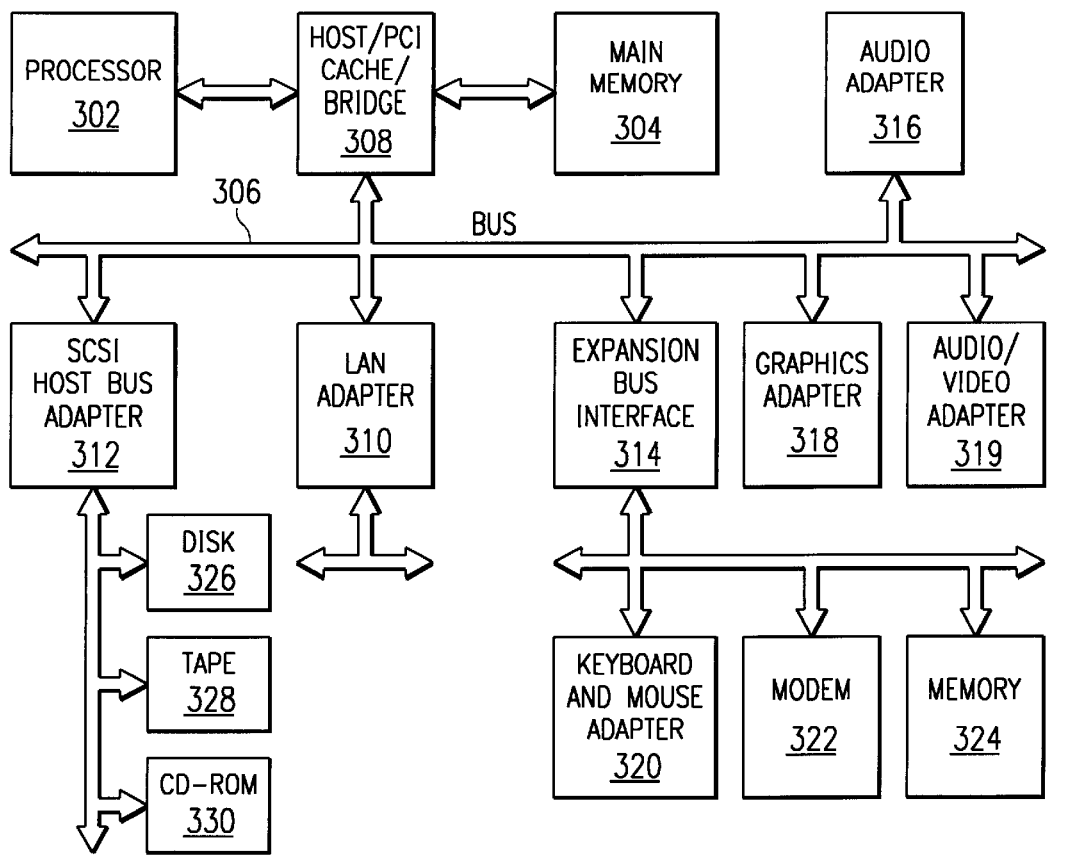
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, apparatus, and instructions for selecting a virtual machine for use with an application and in particular for use with a browser in the depicted examples. The present invention provides a graphical user interface (GUI) associated with the web browser that allows a user to specify which Java virtual machine will be used by the browser. This mechanism is used in supporting decoupling the browser from a fixed Java environment, which allows for using releases of Java virtual machines independently from releases of browsers. In addition, the present invention provides for allowing for different Java virtual machines to be selected for different profiles when multiple user profiles are present for the browser. As used herein, the term "browser" refers to browsers in addition to hypertext markup language (HTML) browsers, such as Netscape Communicator for OS/2. In addition, a browser may encompass other applications that navigate in a Java based network.

In the depicted examples, the processes and interfaces described are for a browser, such as Netscape Communicator operating in an OS/2 operating system. These examples are not intended to limit the invention to a particular browser or operating system. The processes and interfaces of the present invention may be applied to other types of browsers and operating systems.

Figure 4:
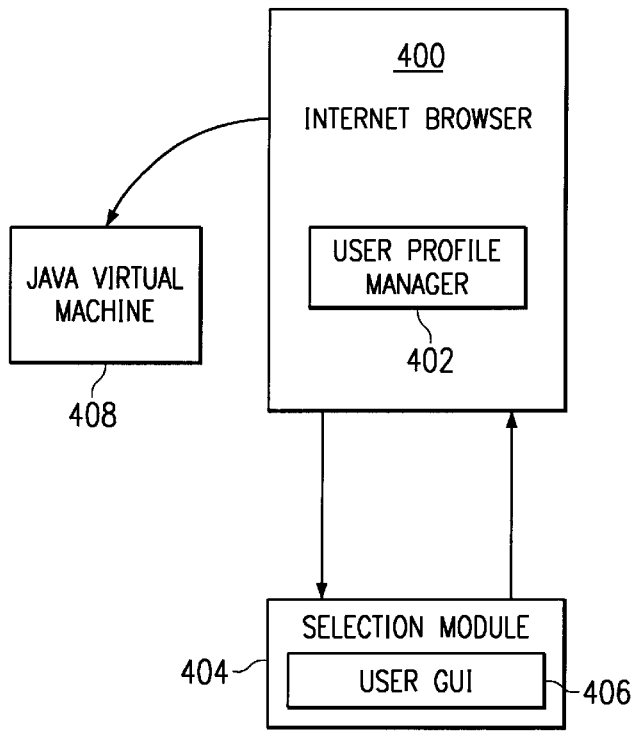
FIG. 4 is a block diagram of components used to select a Java virtual machine for use with a browser in accordance with a preferred embodiment of the present invention.

With reference now to FIG. 4, a block diagram of components used to select a Java virtual machine for use with a browser is depicted in accordance with a preferred embodiment of the present invention. Internet browser 400 contains a user profile manager 402, which is employed to manage one or more user profiles for internet browser 400. Internet browser 400 may be implemented by modifying a known browser, such as, for example, Netscape Communicator, which is available from Netscape Communications Corporation. Selection module 404 contains the processes used in providing a user an ability to select a JVM. Selection module 404 presents a GUI 406 to the user, which allows the user to select a JVM. Selection module 404 queries user profile manager 402 within internet browser 400 for user profile information to display to a user in selecting a JVM. Information is displayed to the user through the GUI 406. Selections or changes in JVMs are received as user input through GUI 406. This user input is returned to user profile manager 402 when a JVM is to be started by internet browser 400, the user profile information is employed to start JVM 408.

Figure 5A:
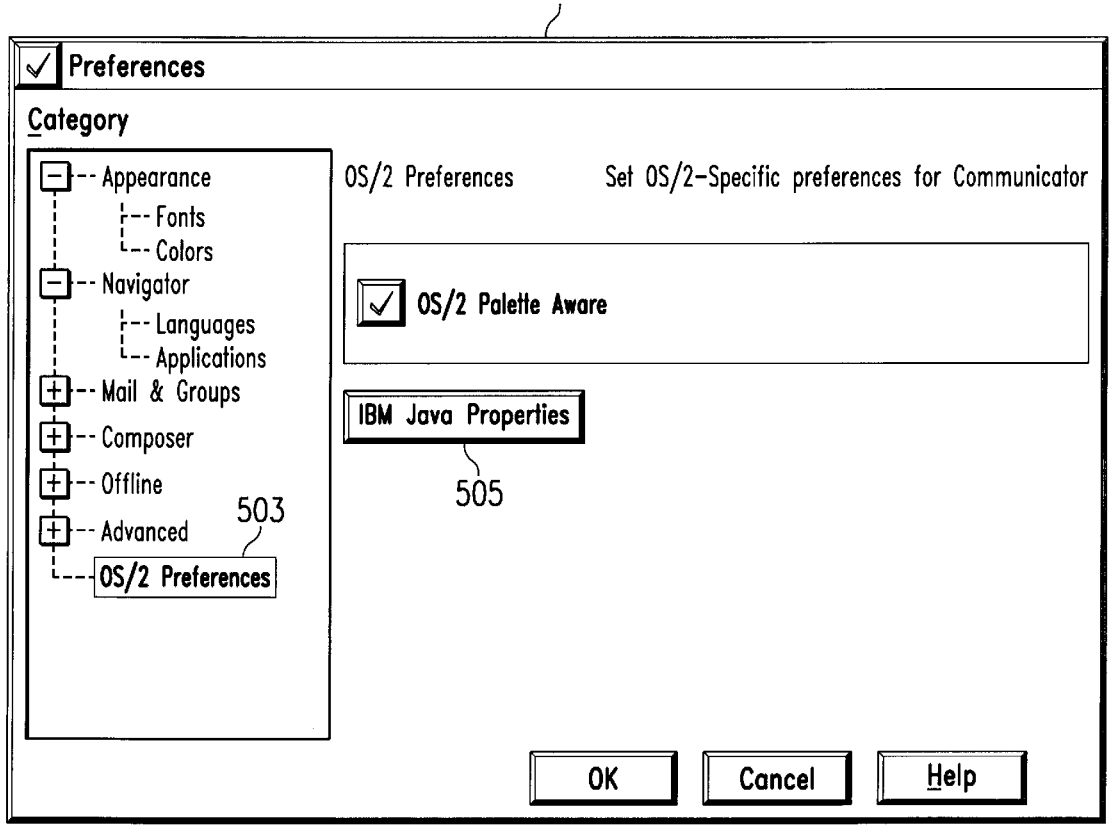
Figure 5B:
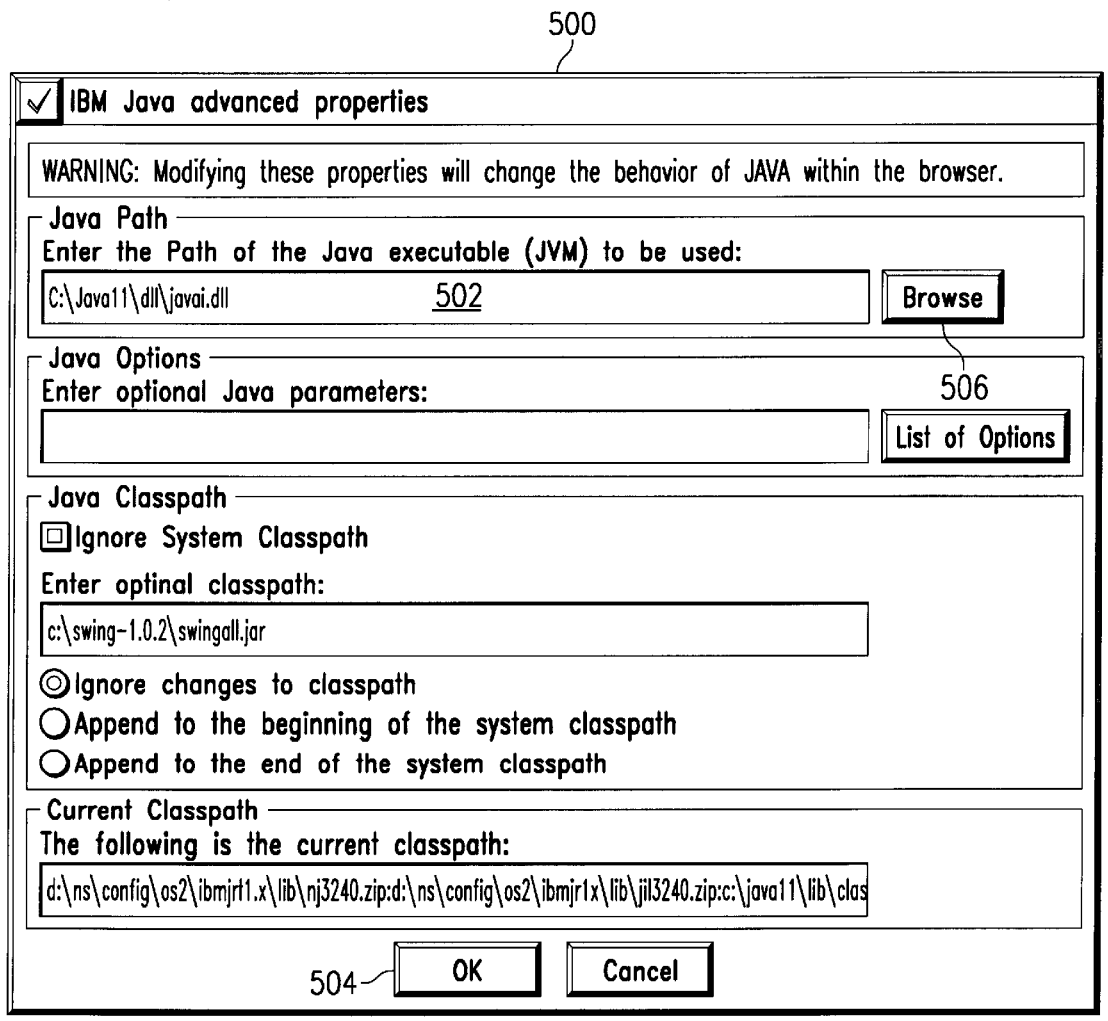

With reference now to FIGS. 5A–5C, graphical user interfaces employed to select a Java virtual machine are depicted in accordance with a preferred embodiment of the present invention. These interfaces are dialogs that may be displayed to a user in a browser, such as Netscape Communicator used with OS/2 as an operating system. Turning first to FIG. 5A, a preferences dialog 501 is displayed to the user in response to the user selecting a preferences option from the browser. Preferences dialog 501 contains a number of categories including an OS/2 preferences category 503, which may be used to select OS/2 specific preferences for the browser. Various properties may be set by selecting IBM Java properties button 505. In FIG. 5B, graphical user interface (GUI), Java advanced properties dialog 500, provides the user with an interface to select a JVM for use with the browser. This dialog is displayed in response to selecting IBM Java properties button 505 from FIG. 5A. In particular, Java advanced properties dialog 500 displays a path field 502 in which a path for an existing JVM may be displayed for the user to accept by depressing OK button 504 or to enter a new path for the JVM that is to be used with the browser. In addition, the user may "browse" for JVMs by depressing browse button 506. In the depicted example, the user browses a local machine in which the file is prefilled with Javai.dll, which allows a user to select from any available JVM file. Depending upon the implementation, the user may browse the network for the desired JVM file. Selection of browse button 506 results in browser dialog 508 in FIG. 5C being displayed to the user. GUI 508 displays path field 510 in which the path for a JVM may be displayed to a user. File types may be selected in type field 512 with particular storage devices being selected in drive field 514. By using type field 512 and drive field 514, various directories and files may be displayed in directory field 516 and file field 518, respectively. Selection of a file will result in the name of the file being displayed in file name field 520. Depressing OK button 522 in browse dialog 508 results in the selected file being used as the selected JVM.

With reference now to FIG. 6, a diagram of a user profile data structure managed by a user profile manager is depicted in accordance with a preferred embodiment of the present invention. The user profile data structure is configured using the interfaces illustrated in FIGS. 5A–5C in the depicted examples. User profile data structure 600 contains information used to configure behavior of the web browser for a particular user. In the depicted example, user profile data structure 600 includes a profile name 602, a Java class path 604, Java parameters 606, a Java path 608, and a Java class path option 610. Profile name 602 is used to uniquely identify the profile from other profiles when the browser contains multiple user profiles. Java class path 604 is used to identify the path in which classes are loaded for use by the JVM. Java parameters 606 contain parameters used by a JVM when the browser initializes or starts a JVM for use with the browser. These parameters may include, for example, initial heap size, garbage collection information, Java stack size, and reporting options for JVM information. Java path 608 includes the path and file name for the JVM that is to be used with the browser. Java class path option 610 provides information that may be used to depend an extended class path to the beginning or end of the system defined class path. User profile data structure 600 also includes other information (not shown) employed to define the behavior of the browser. User profile data structure 600 also includes, for example, the browser start up home page, font preferences, and default browser window size.

With reference now to FIG. 7, a high level flowchart of a process used to select a JVM for use with a web browser is depicted in accordance with a preferred embodiment of the present invention. The process begins by obtaining user profile data (step 700). This data is obtained from the user profile manager within the browser. Data is displayed to a user through a GUI (step 702). A determination is then made as to whether the JVM is to be changed (step 704). For example, this step may be used to change the version of the JVM that is to be used with the browser. Although the depicted examples use a user profile data structure to switch JVMs, this information also may be maintained in other data structures in accordance with a preferred embodiment of the present invention.

If the version is not to be changed, the process terminates. Otherwise, the new JVM is obtained (step 706). The new JVM is obtained through a GUI presented to the user in which the user may select the path and file name for the new JVM to be used with the browser. Depending upon the implementation, the process could search the system for various JVMs that are present and present these as choices to the user for selection. Thereafter, the new settings for the JVM are written or sent to the profile manager in the browser (step 708) with the process terminating thereafter.

Figure 8:
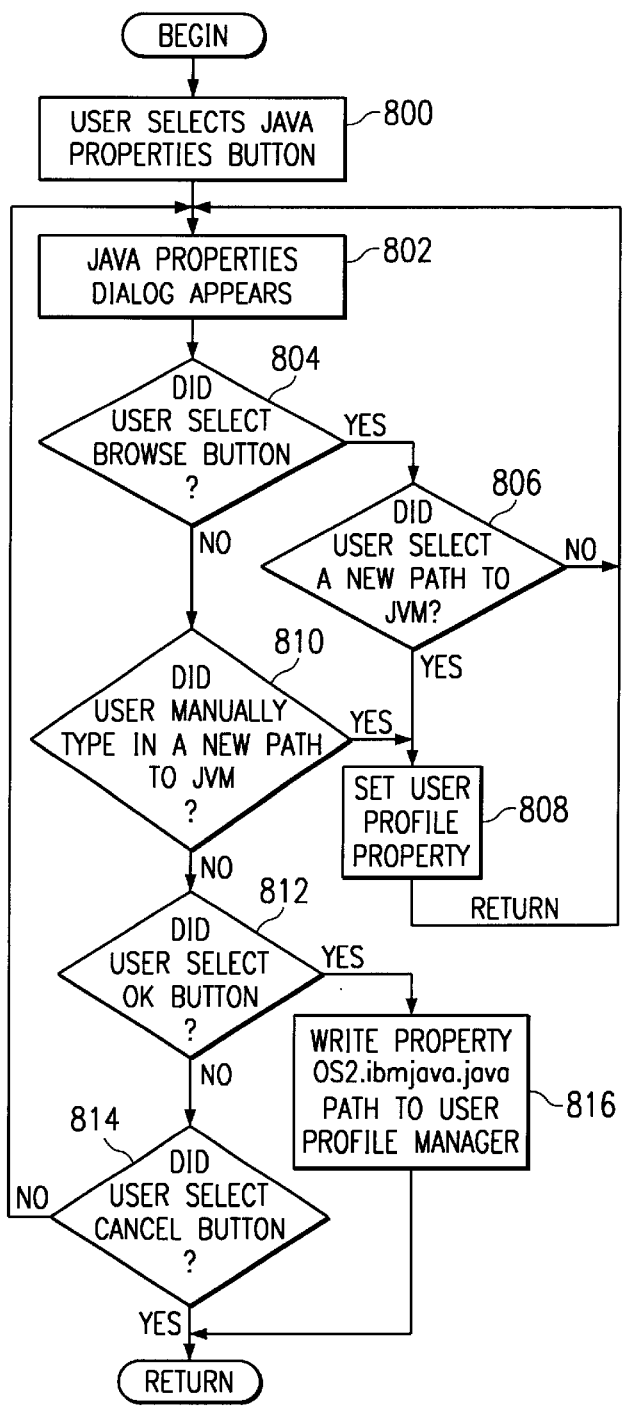
FIG. 8 is a flowchart of a process used to select a JVM in accordance with a preferred embodiment of the present invention.

With reference now to FIG. 8, a flowchart of a process used to select a JVM is depicted in accordance with a preferred embodiment of the present invention. The process begins by a user selecting a Java properties button, such as, for example, IBM Java properties button 505 in FIG. 5A, in the browser (step 800). Next, a Java properties dialog box is displayed to the user (step 802). Then, a determination is made as to whether the user has selected the browse button in the Java properties dialog box (step 804). If the user has selected the browse button in the Java properties dialog box, a determination is made as to whether the user has selected a new path to the JVM (step 806). If the user has not selected a new path to the JVM, the process returns to step 802. This return to step 802 from step 806 typically occurs when the user selects the cancel button in the Java properties dialog. On the other hand, if the user has selected a new path to the JVM, the user profile property is set (step 808), with the process then returning to step 802. The user profile property set in step 808 is the Java path to the JVM and the file name of the JVM. This property may be set using Java path 608 in FIG. 6.

With reference again to step 804, if the user has not selected the Java properties dialog box, a determination is made as to whether the user has manually typed in a new path to a JVM (step 810). If the user has typed in a new path, the process proceeds to step 808 to set the user profile property using the path typed by the user. Otherwise, a determination is made as to whether the user selected the OK button from the Java properties dialog (step 812). If the OK button has not been selected, a determination is made as to whether the user has selected the cancel button (step 814).

If the user has selected the cancel button, the process terminates. Otherwise, the process returns to step 802 as discussed above. With reference again step 812, if the user has selected the OK button from the Java properties dialog, the user profile property containing the class path is written to the user profile manager (step 816).

Figure 9:
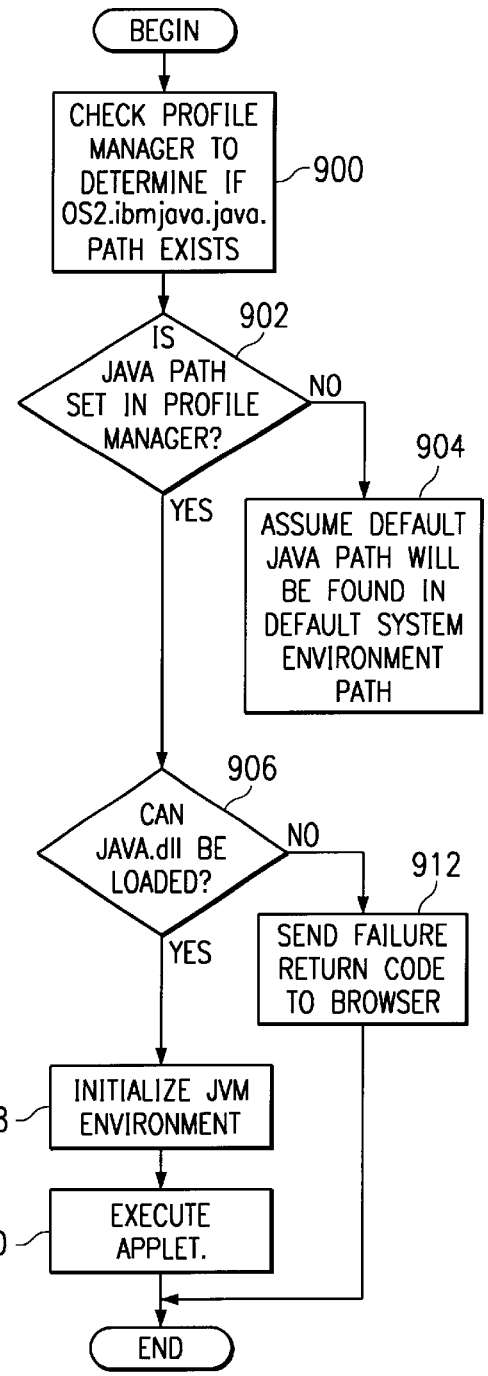
FIG. 9 is a flowchart of a process for starting a JVM by the browser in accordance with a preferred embodiment of the present invention.

With reference now to FIG. 9, a flowchart of a process for starting a JVM by the browser is depicted in accordance with a preferred embodiment of the present invention. The process begins by checking the profile manager to determine if the Java path name exists (step 900). For example, a Java path may be "OS2.ibmjava.java.path". A determination is made as to whether the Java path name is set for a user profile in the profile manager (step 902). If the Java path is not set for the user profile in the profile manager, an assumption is made that the default Java path will be found in the default system environment path (step 904). The default system environment is the value of the classpath variable before starting the browser.

Next, a determination is made as to whether the Javai.dll can be loaded (step 906). The process also proceeds to step 906 from step 902 if the Java path is set in the profile manager. If the Javai.dll can be loaded, the JVM environment is initialized (step 908), and the applet is executed (step 910) with the process terminating thereafter. This applet may be one received by the browser from the Internet or an intranet. With reference again to step 906, if the Java.dll cannot be loaded, a failure return code is sent to the browser (step 912) with the process terminating thereafter.

Thus, the present invention provides an improved method and apparatus for updating JVMs used by a browser. The present invention provides this advantage by decoupling the JVM from the browser and allowing the user to select a JVM for use with the web browser through a GUI. Multiple user profiles may contain different JVMs or versions of JVMs for use with the browser. In this manner, multiple users may have different selections for the JVM being used by the browser. For example, a network administrator may use the interface of the present invention to test a new version of the JVM before committing the change to a main profile, which typically is a default profile for a particular user id. Additionally, a user may have multiple profiles for a particular browser. The present invention also may be used with multiple browsers in which multiple JVMs are present for the different browsers. In such a situation, the multiple JVMs also may be selected for different versions of the browser. Additionally, the present invention may be applied to selecting different JVMs for different windows in which different windows may be running the same or different JVMs. In addition, the processes of the present invention may be applied to dynamically switching JVMs rather than just switching JVMs when the browser or JVM is initialized.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry but the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for selecting a virtual machine for use with a browser, the method comprising the data processing system implemented steps of:

prompting a user for an input, wherein input identifies a virtual machine to be used with the browser;

altering a profile for the browser to include an identification of the virtual machine identified by the input; and using the profile to select a virtual machine for use with the browser.

2. The method of claim 1, wherein the profile includes multiple user profiles and the step of altering a profile comprises altering a user profile within the multiple user profiles.

3. The method of claim 1, wherein the virtual machine is a Java virtual machine.

4. A method in a data processing system for selecting a virtual machine for use with a browser:

displaying a graphical user interface in which a virtual machine may be selected for use with the browser;

receiving a selection of the virtual machine from the graphical user interface;

storing the selection of the virtual machine; and initializing a virtual machine using the selection.

5. The method of claim 4, wherein the selection is a path including a file name for the virtual machine.

6. The method of claim 4, wherein the virtual machine is a Java virtual machine.

7. The method of claim 4, wherein the step of storing comprises storing the selection of the virtual machine in a user profile.

8. A data processing system for selecting a virtual machine for use with a browser, the data processing system comprising:

prompting means for prompting a user for an input, wherein input identifies a virtual machine to be used with the browser;

altering means for altering a profile for the browser to include an identification of the virtual machine identified by the input; and using means for using the profile to select a virtual machine for use with the browser.

9. The data processing system of claim 8, wherein the profile includes multiple user profiles and the altering means comprises means for altering a user profile within the multiple user profiles.

10. The data processing system of claim 8, wherein the virtual machine is a Java virtual machine.

11. A data processing system for selecting a virtual machine for use with a browser, the data processing system comprising:

displaying means for displaying a graphical user interface in which a virtual machine may be selected for use with the browser;

receiving means for receiving a selection of the virtual machine from the graphical user interface;

storing means for storing the selection of the virtual machine; and initializing means for initializing a virtual machine using the selection.

12. The data processing system of claim 11, wherein the selection is a path including a file name for the virtual machine.

13. The data processing system of claim 11, wherein the virtual machine is a Java virtual machine.

14. The data processing system of claim 11, wherein the storing means comprises means for storing the selection of the virtual machine in a user profile.

15. A computer program product in a computer readable medium for selecting a virtual machine for use with a browser, the computer program product comprising: first instructions for displaying a graphical user interface in which a virtual machine may be selected for use with the browser;

second instructions for receiving a selection of the virtual machine from the graphical user interface;

third instructions for storing the selection of the virtual machine; and fourth instructions for initializing a virtual machine using the selection.

* * * * *